Patented Aug. 30, 1932

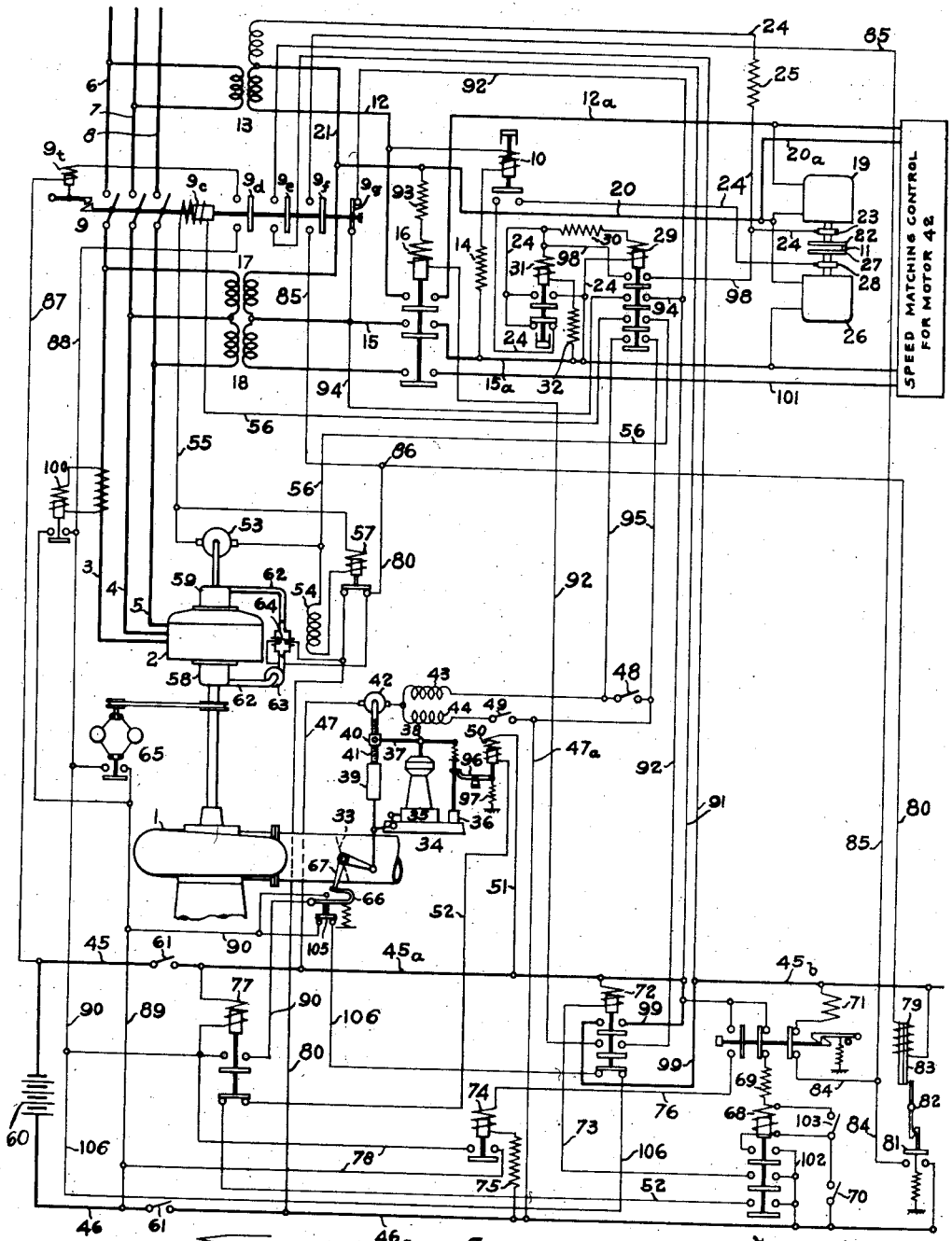

1,873,976

UNITED STATES PATENT OFFICE

TERRYL B. MONTGOMERY, OF MILWAUKEE, AND PAUL M. STIVENDER, OF WEST ALLIS, WISCONSIN, ASSIGNORS TO ALLIS-CHALMERS MANUFACTURING COMPANY, OF MILWAUKEE, WISCONSIN, A CORPORATION OF DELAWARE

CONTROL SYSTEM

Application filed January 6, 1930. Serial No. 418,710.

This invention relates to control systems, and more particularly to systems for automatically starting, connecting and loading prime mover-generator units.

A general object is the protection of the unit from abnormal conditions which may arise while the unit is being started or after it has been connected to the distribution system or line. In accordance with this general object it is an object to provide means whereby the unit will be prevented from being connected to the line if the abnormal conditions obtain for a predetermined time, or the unit will be shut down at once if the abnormal conditions arise after the unit has been connected. Another object is the protection of the unit against overspeed, and more particularly against hunting.

A further object is the provision of a simple means for causing the generator to assume a load at the time of connection to the line. More specifically, it is an object to provide a means responsive to frequency, or phase relations, or both, of the generator and line, which means controls both the connection of the generator to the line and also the supply of operating fluid to the prime mover. Other objects will appear hereinafter as the description of the invention proceeds.

The novel features of the invention will appear from this specification and the accompanying drawing forming a part thereof and showing several embodiments of the invention and all these novel features are intended to be pointed out in the claims.

In the drawing, Fig. 1 is a diagrammatic showing of one embodiment of the invention, and Fig. 2 is a modified detail.

Referring to Fig. 1 a prime mover 1, here shown as a hydraulic turbine, is shown as in driving relation to a generator 2. The generator 2 is here indicated as of the three phase alternating current type and has three conductors 3, 4, 5 leading therefrom and connectible to a line or distribution system having conductors 6, 7, 8, through an automatic circuit breaker 9. The circuit breaker 9 is shown in the open position and may be operated to the closed position by energization of a closing coil $9_c$. When in the closed position the circuit breaker is latched and the latch may be tripped by means of a trip coil $9_t$. The circuit breaker 9 is provided with a number of auxiliary contacts of which contacts $9_d$, $9_e$ and $9_f$ are open when the circuit breaker is open and the contact $9_g$ is closed when the circuit breaker is open. The purpose of these contacts will appear more fully hereinafter.

The circuit breaker 9 may be closed under the control of an automatic synchronizer the principal elements of which are a relay 10 and a contact 11 operable in a manner to be descried. This synchronizer may be of the form shown and described, for example, in an application of P. M. Stivender, Serial No. 411,947, filed December 5, 1929. It will be plain however that the synchronizer may be of any other suitable form. So much of this synchronizer as appears necessary for a clear understanding of the present invention will be described herein.

The relay 10 is provided with a back contact. By "back contact" is meant a contact which closes when the relay is effectively deenergized. The relay 10 has one terminal connected to a conductor 12 in turn connected to one terminal of the secondary of a transformer 13 the primary of which has its terminals connected to the line conductors 6, 7. The other terminal of relay 10 is connected through a resistance 14 to a conductor $15_a$. This conductor is connectible to a conductor 15, through a contact of a relay 16, to the point of connection between the secondaries of two transformers 17, 18 the primaries of which have their terminals connected respectively to the generator conductors 3, 4 and 4, 5. The other terminal of the secondary of transformer 17 is connected by means of a conductor 21 to a tap on the secondary of transformer 13. The tap is so chosen that that portion of the secondary of transformer 13 between said tap and conductor 12 will, when the generator and line are of equal voltage, be equal to the voltage across the secondary of transformer 17. The connections of relay 10 are accordingly such that when the voltage of the generator and line are substantially the same and in phase the voltage across said relay is substantially zero. The other principal portion of the synchronizer includes a motor 19 having one terminal connected to a conductor $12_a$ connectible through a contact of relay 16 to the conductor 12. The other terminal of motor 19 is connected to a conductor 20 in turn connected to conductor 21. The motor 19 is adapted to drive an insulating disk 22 which has in the face thereof two or more suitably spaced contacts adapted to be engaged by the contact 11 as fully described in the aforesaid application Serial No. 411,947. The contacts carried by disk 22 are connected to a slip ring 23. Another motor 26 has one terminal thereof connected to conductor 20 and the other terminal to conductor $15_a$. The motor 26 is adapted to drive a disk 27 which carries the contact 11. The contact 11 is connected to a slip ring 28. When the contact of relay 10 is closed and contact 11 engages one of the contacts on the disk 22, a conducting path 24 is completed for a relay 29. This path is from conductor $15_a$ through relay 29 a resistance 30, a back contact of a relay 31, the contact of relay 10, slip ring 28, contact 11, a contact on disk 22, slip ring 23, a resistance 25 to the upper terminal of transformer 13.

In shunt with the resistance 30 and relay 29 is the relay 31 having in series therewith a resistance 32. The relay 31 is consequently energized simultaneously with relay 29 but is not at once effectively operated since it is of the time limit type. The function of relay 31 will appear hereinafter.

All of the contacts of relay 29 are front contacts, that is, they are adapted to be closed when the relay is energized. One of the contacts of relay 29 is adapted to close a conducting path 55, 56 through the closing coil $9_c$. This path is here shown as fed from an exciter 53. Another contact of relay 29 is adapted to close a conducting path 98 around back contact of relay 31, contact of relay 10, and contact 11.

The prime mover is here shown as controlled by means of a speed governor 34 which includes a servo-motor 35 adapted, through suitable links and levers, to operate a gate 33 in a conduit through which operating fluid is admitted to the prime mover 1. The term gate is used for the sake of brevity to connote any means for controlling the admission of operating fluid to the prime mover. The servo-motor 35 may be controlled by a regulating valve 36 the stem of which is suitably connected to one end of a floating lever 37. The floating pivot 38 of lever 37 is positioned by means of speed responsive means such as flyballs (not shown) driven in any suitable manner so as to revolve at a speed in proportion to that of the prime mover. The other end of the lever 37 is connected in a suitable manner to the usual dash pot or compensating device 39, the other element of a dash pot being connected so as to move in unison with the gate 33. The last named end of lever 37 is swivelled to a nut 40 cooperating with a screw 41. The screw 41 is adapted to be rotated by means of a motor 42 to thereby alter the position of the nut 40 and consequently change the speed setting of the governor so as to raise or lower the speed at which the prime mover tends to run as may be required. The motor 42 is here shown as of the split field type having a pair of field windings 43, 44. Current may be supplied for operating motor 42 from a battery 60 having terminal conductors 45, 46 connectible through a switch 61 to the battery control buses $45_a$, $46_a$, respectively. One terminal of the armature of motor 42 is connected through a conductor 47 to bus $45_a$, and, depending upon whether a switch 48 or a switch 49 is closed, current will flow through the motor armature and then through either field winding 43 or 44 respectively, through a conductor $47_a$ to the battery bus $46_a$. The motor 42 will rotate in such direction, for example, when switch 48 is closed that the governor 34 is adjusted to cause increase in speed setting and therefore increase in speed of the prime mover or a tendency for increase after the generator 2 is connected to the line to thereby cause said generator to take a load. The switch 49 on the other hand when closed causes such rotation of the motor 42 as to decrease the speed setting. The switch 48, may be shunted by a conducting path 95 in which is interposed a contact of relay 29. The switches 48, 49 are shown merely as representative of switches which may be utilized to control motor 42. Other switches may be employed when the motor 42 is controlled by a speed matching device such, for example, as that disclosed in an application of P. M. Stivender, Serial No. 411,947, filed December 5, 1929. Since any form of control for matching the speed and frequency of the generator 2 with that of the line 6, 7, 8 may be employed the details of such an apparatus have been omitted for the sake of clearness, the apparatus being indicated by the box with the legend "speed matching control for motor 42." While conductors $12_a$, $20_a$, $15_a$ and 101 are shown leading to the speed-matching control, it will be clear that the connections are a matter depending upon the choice of the type of speed-matching control.

The relay 16 which controls the synchronizing and speed-matching apparatus, has one terminal connected through a resistance 93 to conductor 21 the other terminal being connected through a conducting path 92 to conductor 15. In the conducting path 92 are interposed a front contact of a relay 72 and the auxiliary switch $9_g$. In shunt with a switch $9_g$ is a conducting path 94 in which is interposed a front contact of relay 29.

Here shown as adapted to be driven by generator 2 is an exciter 53 for supplying current to a main field winding 54 for the generator 2. Interposed in series with the field winding 54 is a relay 57, having a back contact, the function of which will appear hereinafter.

The generator 2 is here shown as provided with a guide bearing 58 and a thrust bearing 59. An oil circuit 62 is provided between these bearings so that oil may be pumped by the pump 63 from the oil well in bearing 58 to the thrust bearing 59. Interposed in this oil circuit is a switch 64 which is open when there is oil flowing from the bearing 58 to bearing 59. The pump 63 may be driven in any suitable manner so as to be in operation when the generator is in operation.

The system is controlled by a master relay 68, having three front contacts, one terminal of which is connectible through a resistance 69, through a back contact of a switch 71 to bus $45_a$. The other terminal of relay 68 is connectible through a master switch 70 to a bus $46_a$. The master switch 70 may be operated in any suitable manner either by hand or in response to predetermined conditions.

The switch 71 is of the latched-in type, that is, it is latched in the position shown and the latch may be tripped by the trip coil as indicated. The switch 71 cannot be reclosed except by manual operation. One terminal of trip coil of switch 71 is connected to a conductor $45_b$ the other terminal being connected, through a back contact of switch 71 through a conductor 84, through a contact 81 (of a retarded relay 79) to the bus $46_a$. It may be noted that the conductor $45_b$ is a continuation of bus $45_a$ when a conducting path 99 is completed by a relay 72. The connection between bus $45_a$ and conductor $45_b$ which is completed by relay 72 through conductor 99 may also be completed through a conducting path 91 in which is interposed auxiliary switch $9_e$.

The relay 72 has one terminal connected to the bus $45_a$ the other being connectible through a conductor 73, through a contact of master relay 68 to the bus $46_a$.

The latched-in switch 71 controls another relay 74 one terminal of which is connected through a resistance 75 to bus $46_a$ the other terminal being connectible to bus $45_a$ through a conductor 76 and a front contact of switch 71.

A relay 77, having one front and one back contact, has one terminal connected to bus $45_a$ the other terminal being connectible to the battery terminal 46 through a conductor 78 in which is interposed the contact of relay 74.

The retarded relay 79 is here shown as of the thermostatic type relay having a heater coil one terminal of which is connected to a conductor $45_b$ and the other terminal through a conducting path 80 to the bus $46_a$. In the conducting path 80 is interposed the contact of relay 57 which is closed when the current through the field winding 54 is less than a predetermined amount. It will be noted that the contact 64 which is responsive to a predetermined amount of oil flow in the oil circuit 62 is in shunt with the contact of relay 57. Consequently the conducting path 80 will be completed when either the oil flow or the field current is insufficient. The relay 79 is provided with a contact 81 which is latched in the open position and biased toward the closed position. The relay 79 is here shown as of the type provided with a bimetallic bar 83 which when current has been flowing through the heater coil a predetermined time operates the latch 82 to thereby permit the contact 81 to move to the closed position.

The relay 71 besides being energizable by the contact 81 as hereinbefore described, may also be energized through a conducting path 85 connected to the conductor 84 and at a point 86 to the path 80. Interposed in the path 85 is the auxiliary switch $9_f$ of the circuit breaker 9 so that this path cannot be completed until the circuit breaker is closed. From the point 86 the said conducting path for relay 71 to bus $46_a$ is through either the contact of relay 57 or through switch 64.

The trip coil $9_t$ of the circuit breaker has one terminal connected through conductor 87 to the battery terminal 45 and the other terminal, through auxiliary switch $9_d$ to a conductor 88 in turn connected to one terminal of an auxiliary centrifugal switch 65. The other terminal of the centrifugal switch 65 is connected through a conductor 89 to the battery terminal 46. In shunt with the centrifugal switch 65 is a conducting path 90 in which is interposed the front contact of a relay 77 and also a switch 66. Also in shunt with centrifugal switch 65 is the contact of an overload relay 100.

The switch 66 is here shown as operable by means of a cam 67 moving in unison with the gate 33. The relation between the gate 33 and the switch 66 is such that when the gate is closed the switch 66 is open and remains open until the gate has moved to such an open position that sufficient operating fluid is admitted to the prime mover to drive it preferably at normal speed without load. Any suitable form of switch 66 and operating means therefor which will accomplish a desired relation between the gate position and the position of the switch may of course be utilized.

The cam 67 is here shown as also adapted to operate a switch 105 which is closed when the gate is in closed position and does not open until the gate reaches, preferably, the no-load position. The switch 105 is interposed in a conducting path 106, which also includes a back contact of relay 72. Completion of this path completes the circuit of the trip coil $9_t$ as will be apparent.

The governor 34 is provided with means for releasing the same for action so as to cause the same to open the gate 33 to thereby start the prime mover from rest. This means is here shown as including a solenoid 50 the core of which may be restrained by a spring 97. When the solenoid is energized the regulating valve 36 of the governor is permitted to move toward the gate-open position by movement of a pivoted finger 96 to a position where it releases the regulating valve stem. The rate at which the servo-motor of the governor is permitted to open the gate in starting the prime mover from rest and bringing it to synchronous speed may be controlled in any well known manner. The solenoid 50 has one terminal connected through a conductor 51 to bus $45_a$ and the other through a conducting path 52 to the bus $46_a$. In the path 52 is interposed a back contact of relay 77 and a front contact of master relay 68.

The normal operation of the system is as follows. The parts on the drawing are shown in the position they assume when the generator is at rest and disconnected from the line. If it is desired to start the unit the switch 61 is closed thereby energizing buses $45_a$, $46_a$. The master switch 70 is then closed either by hand or automatically thereby energizing master relay 68 through a back contact of latched-in switch 71. One of the contacts of master relay 68 closes a maintaining circuit for that relay. Another of the contacts of relay 68 energizes relay 72 thereby energizing the conductor $45_b$. Another contact of relay 68 completes the circuit for the governor solenoid 50 through the back contact of relay 77. The energization of solenoid 50 releases the governor thereby causing comparatively rapid opening of the gate 33 enough to cause the prime mover 1 to start. Meanwhile closure of relay 72, by energization of conductor $45_b$, has energized the timing relay 79. Another contact of relay 72 completes the circuit of relay 16, but the latter relay is not effectively energized, since it is fed from transformer 17, until the generator voltage has risen to a predetermined value.

After the gate has opened enough to start the prime mover from rest it continues to open at a controlled slower rate and then is free to be controlled by the fly-balls of the governor 34 which have meanwhile come up to governing speed. The fly-balls of the governor then take control of the gate opening to bring the prime mover to substantially normal speed. Meanwhile the voltage of exciter 53 builds up and when the current through the field winding 54 reaches a predetermined value the relay 57 opens its contact. If the speed of the unit has arisen to the proper value and the oil flow in the oil circuit 62 is of a predetermined amount the switch 64 will open. When both relay 57 and switch 64 are open the circuit of timing relay 79 will be interrupted. Since, under normal conditions, this will occur before the latch 82 has been tripped, the switch 81 will not close. The proper building up of the alternating current voltage causes energization of relay 16 thereby causing motors 19 and 26 to rotate the disks 22, 27. If at this time the frequency of generator 2 is not the same as that of the line, the speed matching control for the motor 42 will cause rotation of said motor in one or the other direction depending upon whether the frequency of the generator is lower or higher than that of the line. This changes the speed setting of governor 34 so that the speed of the prime mover is either raised or lowered.

When the frequency of the generator 2 is substantially that of the line and its voltage is in phase with that of the line, the contact 11 will be in engagement with one of the contacts on disk 22 at the same time that the contact of relay 10 is closed. A circuit is therefore completed for relay 29 and one of the contacts thereof closes a maintaining circuit therefor. Another contact of relay 29 energizes the closing coil $9_c$ which thereupon closes the circuit breaker 9 connecting the generator to the line. Another contact of relay 29 shunts the auxiliary contact $9_g$ (which has been opened by closure of the circuit breaker) thereby maintaining the relay 16 energized for the time being. Another contact of relay 29 bypasses the switch 48 thereby causing energization of motor 42 in such direction that the same increases the speed setting of governor 34 thereby causing the generator to take a load.

The closure of circuit breaker 9 causes the auxiliary contact $9_e$ to bypass the conducting path 99.

Simultaneously with the energization of relay 29 relay 31 is energized and after a predetermined time its front contact short-circuits relay 29 thereby deenergizing said relay. The back contact of relay 31 which is in a circuit in shunt with the maintaining circuit of relay 29 is also opened thereby preventing possible reenergization of relay 29 at this time. The deenergization of relay 29 opens the maintaining circuit for relay 16 which then drops out. The opening of relay 16 deenergizes the motors 19 and 26 and all apparatus energized from the conductors $12_a$, 20, $15_a$ and 101, including the speed-matching control for motor 42.

The deenergization of relay 29 opens the path 95 thereby stopping the motor 42. It will be apparent that the amount that the speed setting of the governor 34 is increased by motor 42 above its synchronous speed-no load setting may be adjusted by adjustment of the time limit relay 31.

In case the current in the field winding 54 does not rise to the predetermined value the contact of relay 57 will remain closed and after a predetermined time the relay 79 will release the latch 82 causing closure of switch 81. The latched-in switch 71 is thereby energized opening its own circuit and that of the master relay 68. The front contact of switch 71 energizes relay 74 thereby tripping the circuit breaker. The opening of master relay 68 deenergizes the solenoid 50 whereupon the lever 96 moves the stem of regulating valve 36 to the gate-closed position. This causes closure of the gate 33 and shuts down the unit. After tripping of switch 71 in the manner stated it is not possible to again start up the unit through control by the master switch 70 until an attendant has visited the plant to investigate the trouble and has manually reclosed switch 71.

What has been stated in the preceding paragraph with respect to the shutting down of the plant in response to failure of the current to build up in the generator field winding also applies to failure of oil flow in the circuit 62. It will be evident that since the switch 64 is in shunt with the contact of relay 57 that either the said relay or switch will cause shutting down of the unit in case they are not opened within a predetermined time as determined by the setting of retarded relay 79.

In case the current through field winding 54 drops to a predetermined amount, after the generator 2 is connected to the line the latched-in switch 71 is at once energized through the conducting path 85 through auxiliary contact $9_f$, contact of relay 57 to bus $46_a$. It will be noted that closure of circuit breaker 9 provides this additional path for energization of relay 71 so that this relay may be energized immediately when the generator is on the line, without waiting for action by the retarded relay 79. The same action occurs in case the flow of oil in circuit 62 drops to a predetermined amount so that switch 64 is closed.

In general, when the switch 71 is tripped its front contact completes a circuit for the relay 74 which in turn completes a circuit (through conducting path 78, 90, 88, 87) for the trip coil $9_t$, thereby opening the circuit breaker, if the same is closed.

In case the generator 2 is disconnected from the line by some abnormal condition (other than one which causes shut-down of the unit by switch 71), as for example by operation of the overload relay 100, the action would ordinarily be that, due to the sudden reduction in load, the speed of the generator would rise above normal. Since a comparatively small percentage of rise in speed above normal may cause the governor 34 to substantially or completely close the gate 33 the speed of the unit would come down thereby causing reopening of the gate while the speed was still decreasing. The gate would consequently open too far and when the influence of the larger gate opening began to be again felt upon the prime mover the speed would again rise to a value above normal. This "hunting" action is prevented as follows: Upon closure of the overload relay as stated, the relay 77 is energized and closes a maintaining circuit for itself through its front contact and the switch 66. The back contact of relay 77 opens the circuit of the governor solenoid 50 thereby causing the governor to close the gate 33. Meanwhile the speed of the unit has increased and at a predetermined rise above normal the auxiliary centrifugal switch 65 closes thereby by-passing the aforesaid maintaining circuit for relay 77. As the gate moves toward closed position, at a predetermined point in its travel it opens switch 66. When, because of closure of the gate, the speed, drops to a predetermined value, say no load synchronous speed or below that, the switch 65 will open and therefore the circuit for the relay 77 will be interrupted thereby reenergizing solenoid 50 and permitting the governor 34 to again control the gate in the manner as for starting the prime mover from rest, that is the gate will open at predetermined rates independently of free control by the fly-balls of the governor. Stable conditions will now obtain so that the speed-matching apparatus and synchronizer can again properly control the speed of the opening unit and its connection to the line. It may be noted that opening of the circuit breaker 9 of course causes reenergization of relay 16 under the aforesaid conditions, if relay 72 is energized.

The unit may be shut down by closure of a stop switch 103, operable manually or by any predetermined condition. This switch short-circuits the operating coil of relay 68 thereby deenergizing governor solenoid 50. Deenergization of relay 68 also deenergizes relay 72 which closes its back contact. The deenergization of the governor solenoid causes closure of gate 33 and when it reaches the no load-synchronous speed position the switch 105 is closed thereby completing a circuit through said switch and the back contact of relay 72 through the trip coil $9_t$ of the circuit breaker, thereby disconnecting the unit from the line.

Referring to Fig. 2, this shows a modification of the parts immediately associated with the governor solenoid 50 which may be provided particularly if the governor mechanism itself does not include any means for limiting the rate of gate opening during the starting period. In this figure the solenoid core is shown in operative relation to the piston 108 of a dash pot 109. When the solenoid is deenergized the piston is disposed in an enlarged portion of the dash pot so that a predetermined amount of free movement of the piston is permissible before it enters a restricted portion 110 by reason of which a retarding action is exerted on further movement of the core until the piston leaves the restricted portion and enters the upper enlarged portion of the dash pot.

When the solenoid 50 is deenergized, an extension of the lever 96$_a$ opens a switch 107. The switch 107 takes the place of switch 66 in system shown in Fig. 1.

The operation of a system in which the system of Fig. 1 has been modified as explained in connection with Fig. 2 is as follows. When the solenoid 50 is energized, in the manner set forth in connection with Fig. 1, the lever 96$_a$ permits the regulating valve 36 to open at once sufficiently to cause opening of gate 33 enough to start the prime mover from rest. While the dash pot piston 108 moves through the restricted portion 110 the retarded opening movement of the regulating valve 36 permits only a slow further opening movement of gate 33. The rate of retardation is preferably such that the prime mover has come up to approximately normal speed at or near the end of the retardation period. When the piston has passed the restricted portion the regulating valve is entirely freed for control by the governor fly-balls.

In case the circuit breaker is tripped by, for example, the overload relay 100, the relay 77 is energized thereby deenergizing the solenoid 50. The relay 77 establishes a maintaining circuit for itself through its front contact and the switch 107. As the speed of the unit rises due to the sudden reduction of load, the centrifugal switch 65 bypasses the said maintaining circuit of relay 77. It will be evident that the deenergization of solenoid 50 does not at once bring the regulating valve 36 to its fully gate-closed position due to the retarding action of the restricted portion 110. When the piston reaches its lowest position, the regulating valve is at the fully gate-closed position and the lever 96$_a$ opens the switch 107. This insures that the solenoid 50 cannot be reenergized until the piston 108 has been reset to the starting position. When the speed drops to normal or below normal the centrifugal switch 65 opens thereby causing deenergization of relay 77 (if switch 107 is open). The solenoid 50 is then again energized and the starting speed-matching operation for the prime mover is repeated, the generator being reconnected to the line by the synchronizer, as set forth in connection with Fig. 1.

It should be understood that it is not desired to limit the invention to the exact details of description shown and described, for various modifications may occur to persons skilled in the art.

We claim:

1. In a prime mover-generator plant having a circuit breaker for connecting the generator to a line, the combination of means including a speed governor, and a gate for controlling the supply of operating fluid to said prime mover, and auxiliary means responsive to a prime mover speed above a predetermined value for moving said gate toward its closed position to the exclusion of control by said speed governor, and means for restoring control to said first means when said gate moves to a predetermined partially closed position.

2. In a prime mover-generator plant having a circuit breaker for connecting the generator to a line, the combination of means including a speed governor for controlling the supply of operating fluid to said prime mover, auxiliary means responsive to a prime mover speed above a predetermined value for assuming control of said supply of operating fluid to the exclusion of said speed governor, and means whereby said governor is caused to resume control of said supply of operating fluid when the speed of said prime mover returns to a speed below a predetermined value.

3. In a prime mover-generator plant having a circuit breaker for connecting the generator to a line, the combination of means including a speed governor for controlling the supply of operating fluid to said prime mover, auxiliary means responsive to a prime mover speed above a predetermined value for reducing the supply of operating fluid to said prime mover to a predetermined amount to the exclusion of control by said governor, and means whereby said governor is caused to resume control of said supply of operating fluid when the speed of said prime mover returns to a speed below a predetermined value and the supply of operating fluid has been reduced to said predetermined amount.

4. In a prime mover-generator plant having a circuit breaker for connecting the generator to a line, the combination of a gate for controlling the supply of operating fluid to said prime mover, a servo-motor for operating said gate, a regulating valve for said servo-motor, means responsive to the speed of said prime mover for controlling said regulating valve, means responsive to an overload on said generator for assuming control of said regulating valve to the exclusion of said speed responsive means, and auxiliary means responsive to the position of said gate for controlling said control-assuming means.

5. In a prime mover-generator plant having a circuit breaker for connecting the generator to a line, the combination of a gate for controlling the supply of operating fluid to said prime mover, a servo-motor for operating said gate, a regulating valve for said servo-motor, means responsive to the speed of said prime mover for controlling said regulating valve, means for assuming control of said regulating valve to the exclusion of said speed responsive means, means responsive to a predetermined position of said gate, auxiliary means responsive to the speed of said prime mover, and means whereby said control-assuming means is under the joint control of said auxiliary speed responsive means and said means responsive to gate position.

6. In a control system for a prime mover-generator plant connectible to a line, a field winding for said generator, means for supplying said field winding with current, means for initiating control of the supply of operating fluid to said prime mover to start said prime mover from rest, and means responsive to the current through said field winding for cutting off said supply of operating fluid if said current fails to rise to a predetermined value in a predetermined time after said starting operation is initiated.

7. In a control system for a prime mover-generator plant connectible to a line, a field winding for said generator, means for supplying said field winding with current, means for initiating control of the supply of operating fluid to said prime mover to start said prime mover from rest, and means responsive to a predetermined decrease in said field winding current for shutting down said plant.

8. In a control system for a prime mover-generator plant connectible to a line, a field winding for said generator, means for supplying said field winding with current, means for initiating control of the supply of operating fluid to said prime mover to start said prime mover from rest, a time limit relay energized in response to said control initiating means, and a relay responsive to current through said field winding, said relay having a contact controlling said time limit relay.

9. In a control system for a prime mover-generator plant connectible to a line, an automatic circuit breaker for connecting said generator to said line, a field winding for said generator, means for supplying said field winding with current, means for controlling the supply of operating fluid for said prime mover to start said prime mover from rest, means for causing said fluid supply controlling means to shut down said prime mover, a time limit relay energized by said starting controlling means for controlling said shut-down means, means responsive to the current through said field winding for controlling said time limit relay, and means whereby closure of said circuit breaker enables said field current responsive means to directly control said shut-down relay.

10. In a control system for a prime mover-generator unit, means for controlling the supply of operating fluid for said prime mover to start said prime mover from rest, a bearing for said unit, means for supplying said bearing with oil, means for causing said fluid supply controlling means to shut down said prime mover, a time limit relay energized by said starting controlling means for controlling said shut-down means, and means responsive to the condition of said oil supply for controlling said time limit relay.

11. In a control system for a prime mover-generator unit connectible to a line, an automatic circuit breaker for connecting said generator to said line, means for controlling the supply of operating fluid for said prime mover to start said prime mover from rest, means for causing said fluid supply means to shut down said prime moved, a time limit relay energized by said starting control means for controlling said shut-down means, means responsive to predetermined abnormal conditions in said unit for controlling said time limit relay, and means whereby closure of said circuit breaker enables said abormal condition responsive means to directly control said shut-down means.

12. In a control system for a prime mover-generator unit connectible to a line, a self-latching circuit breaker for connecting said generator to the line, a speed governor for controlling the supply of operating fluid to said prime mover, a motor for changing the setting of said governor, a relay having contacts so connected as to effect upon closure thereof the closure and latching of said circuit breaker and having other contacts so connected as to cause during closure thereof the operation of said motor in such a direction that the generator is caused to take on load, a second relay having contacts for de-energizing said first relay a predetermined time after the energization of said first relay, and means responsive to predetermined electrical relations as between said generator and line for simultaneously energizing both of said relays so that said motor controlled by the contacts of said first relay is stopped a predetermined time after the energization of said relays, 13. In a control system for a prime mover-generator unit connectible to a line, a self-latching circuit breaker for connecting said generator to said line, a speed governor for controlling the supply of operating fluid to said prime mover, a motor for changing the setting of said governor, a relay having contacts so connected as to effect upon closure thereof the closure and latching of said circuit breaker and having other contacts so connected as to cause during closure thereof the operation of said motor in such a direction that the generator is caused to take on load, a second relay having contacts for deenergizing said first relay a predetermined time after the energization of said first relay, a third relay controlled by contacts on said first relay and having contacts for connecting and disconnecting said phase responsive means from said line and generator, and means responsive to phase equality as between said generator and line for simultaneously energizing said first and second relays so that said motor controlled by the contacts of said first relay is stopped and said contacts of said third relay are opened a predetermined time after the energization of said relays.

14. In combination, a prime mover and generator driven thereby, a line, a circuit breaker for connecting said circuit breaker to said line, means for controlling the supply of operating fluid to said prime mover, means responsive to the speed of said prime mover for controlling said supply controlling means, means having a starting and running position for assuming control of said supply controlling means to the exclusion of said speed responsive means, means responsive to tripping of said circuit breaker for causing operation of said control-assuming means toward the starting position, and means dependent upon said control-assuming means reaching the starting position for causing said control-assuming means to return through the starting to the running position.

15. In combination, a prime mover and generator driven thereby, a line, a circuit breaker for connecting said circuit breaker to said line, means for controlling the supply of operating fluid to said prime mover, means responsive to the speed of said prime mover for controlling said supply controlling means, means having a starting and running position for assuming control of said supply controlling means to the exclusion of said speed responsive means, means responsive to tripping of said circuit breaker for causing operation of said control-assuming means toward the starting position, auxiliary means responsive to the speed of said prime mover and means dependent upon said control-assuming means reaching the starting position for causing said control-assuming means to return through the starting to the running position and upon effective operation of said auxiliary speed responsive means caused by a reduction in speed of said prime mover to a predetermined amount.

16. In combination, a prime mover and generator driven thereby, a line, a circuit breaker for connecting said generator to said line, means for causing said prime mover to start from rest and for bringing it up to a predetermined speed at a predetermined rate, means for causing closure of said circuit breaker in response to predetermined electrical relations between said line and generator, means responsive to the speed of said prime mover for regulating the speed of said prime mover to a substantially constant value under varying load, and means responsive to tripping of said circuit breaker for causing said starting means to assume control of said prime mover independently of said speed regulating means.

In testimony whereof, the signatures of the inventors are affixed hereto.

TERRYL B. MONTGOMERY.
PAUL M. STIVENDER.